(12) United States Patent
Flasar

(10) Patent No.: US 11,060,155 B2
(45) Date of Patent: Jul. 13, 2021

(54) SURFACE HARDENING OF CEMENTED CARBIDE BODY

(71) Applicant: PRAMET TOOLS, S.R.O., Sumperk (CZ)

(72) Inventor: Petr Flasar, Sumperk (CZ)

(73) Assignee: PRAMET TOOLS, S.R.O., Sumperk (CZ)

( * ) Notice: Subject to any disclaimer, the term of this patent is extended or adjusted under 35 U.S.C. 154(b) by 88 days.

(21) Appl. No.: 16/090,271

(22) PCT Filed: Mar. 30, 2017

(86) PCT No.: PCT/EP2017/057585
§ 371 (c)(1),
(2) Date: Oct. 1, 2018

(87) PCT Pub. No.: WO2017/167906
PCT Pub. Date: Oct. 5, 2017

(65) Prior Publication Data
US 2019/0112679 A1  Apr. 18, 2019

(30) Foreign Application Priority Data

Apr. 1, 2016 (EP) ..................... 16163556

(51) Int. Cl.
*B22F 3/105* (2006.01)
*B22F 3/24* (2006.01)
(Continued)

(52) U.S. Cl.
CPC ............. *C21D 1/74* (2013.01); *B22F 3/105* (2013.01); *B22F 3/24* (2013.01); *B23K 26/123* (2013.01);
(Continued)

(58) Field of Classification Search
CPC ..... C22C 1/051; C22C 29/08; C23C 16/0218; C21D 1/74; B22F 3/105; B22F 3/24
See application file for complete search history.

(56) References Cited

U.S. PATENT DOCUMENTS 6,268,045 B1 *  7/2001  Leyendecker ...... C23C 16/0218
118/724
6,447,912 B1  9/2002  Mikus et al.
(Continued)

FOREIGN PATENT DOCUMENTS

CN  1517449 A  8/2004
CN  103045887 A  4/2013
(Continued)

OTHER PUBLICATIONS

Barletta et al. "Chemical Vapor Deposition of Highly Adherent Diamond Coatings onto Co-Cemented Tungsten Carbides Irradiated by High Power Diode Laser". University of Roma Tor Vergata, Dipartimento di Ingegneria Industriale, Via del Politecnico, I-00133, Rome, Italy, ACS Appl Matter. Interfaces 2012, 4, 694-701, Dec. 29, 2011.

*Primary Examiner* — Scott R Kastler
(74) *Attorney, Agent, or Firm* — Corinne R. Gorski

(57) ABSTRACT

A cemented carbide body includes WC in a metallic binder phase. The cemented carbide body has a bulk portion and a surface portion. The grain size of the WC in the surface portion is smaller than the grain size in the bulk portion of the body and this gives an increased surface hardness and an increased wear resistance. The median grain thickness, tg, of WC in the surface portion is 20-300 nm and the average grain size in the bulk portion is 0.5-8 μm. A method of surface hardening a cemented carbide body is also provided.

6 Claims, 3 Drawing Sheets

(51) Int. Cl.
    *C21D 1/74*         (2006.01)
    *C22C 29/08*      (2006.01)
    *C21D 1/09*         (2006.01)
    *B24D 3/06*         (2006.01)
    *B24D 99/00*      (2010.01)
    *C21D 1/06*         (2006.01)
    *B24D 3/00*         (2006.01)
    *B23K 26/12*       (2014.01)
    *B23K 26/354*     (2014.01)
    *B22F 5/00*         (2006.01)
    *B82Y 40/00*      (2011.01)
    *B82Y 30/00*      (2011.01)

(52) U.S. Cl.
    CPC ........ *B23K 26/1224* (2015.10); *B23K 26/354* (2015.10); *B24D 3/00* (2013.01); *B24D 3/06* (2013.01); *B24D 99/005* (2013.01); *C21D 1/06* (2013.01); *C21D 1/09* (2013.01); *C22C 29/08* (2013.01); *B22F 2003/248* (2013.01); *B22F 2005/001* (2013.01); *B22F 2202/11* (2013.01); *B22F 2207/11* (2013.01); *B22F 2302/10* (2013.01); *B22F 2303/40* (2013.01); *B22F 2304/056* (2013.01); *B22F 2998/10* (2013.01); *B82Y 30/00* (2013.01); *B82Y 40/00* (2013.01); *C21D 2221/00* (2013.01)

(56) References Cited

U.S. PATENT DOCUMENTS

| | | | |
|---|---|---|---|
| 7,708,936 B2 * | 5/2010 | Collin | ............... C22C 1/051 419/18 |
| 2007/0009764 A1 * | 1/2007 | Hashe | ............... C22C 29/08 428/698 |
| 2007/0151769 A1 | 7/2007 | Slutz et al. | |

FOREIGN PATENT DOCUMENTS

| | | |
|---|---|---|
| EP | 0975820 A1 | 2/2000 |
| EP | 1548136 A1 | 6/2005 |

\* cited by examiner

SURFACE HARDENING OF CEMENTED CARBIDE BODY

RELATED APPLICATION DATA

This application is a § 371 National Stage Application of PCT International Application No. PCT/EP2017/057585 filed Mar. 30, 2017 claiming priority to EP 1613556.0 filed Apr. 1, 2016.

TECHNICAL FIELD OF THE INVENTION

The present invention relates to a body of cemented carbide comprising WC in a metallic binder phase and the body comprises a surface portion and a bulk portion. The grain size of the WC in the surface portion is smaller than the grain size in the bulk portion of the body and this gives an increased surface hardness and an increased wear resistance.

BACKGROUND

Cemented carbide is today a well know and very frequently used material in various demanding applications such as cutting tools for metal cutting, mining drill bits and wear parts. It is a material that can withstand high demanding situation, large forces and high temperatures.

One way to improve the wear resistance of a cemented carbide body is to increase the hardness of the surface of the cemented carbide material itself. EP1548136A1 discloses a method to apply Cr and C on the surface of a body of cemented carbide during the sintering and thereby reduce the Co content and limit the WC grain size in the surface region.

There is a continuous need of providing cemented carbide bodies with an increased wear resistance for example cutting tools that can withstand cutting for longer and longer cutting times.

SUMMARY OF THE INVENTION

One object of the present invention is to provide a cemented carbide body with increased wear resistance. Another object is to provide a method of making such a cemented carbide body.

This object is achieved with a cemented carbide body including WC in a metallic binder phase, wherein the body is composed of a bulk portion and a surface portion, the metallic binder phase content in the surface portion is 50-120 vol % of the metallic binder phase content in the bulk portion, the average grain size of WC in the bulk portion is 0.5-8 μm and a median grain thickness, tg, of WC in the surface portion of 20-300 nm and with a method of surface hardening such a cemented carbide body.

The present invention relates to a body of cemented carbide, wherein the cemented carbide comprises WC in a metallic binder phase. The body is composed of a bulk portion and a surface portion. The median grain thickness, tg, of WC in the surface portion is 20-300 nm. The median grain thickness, tg, of WC in the surface portion may be 20-200 nm, 20-100 nm or 20-50 nm. The metallic binder phase content in the surface portion is 50-120 vol %, preferably 80-100 vol %, of the metallic binder phase content in the bulk portion. The average grain size of WC in the bulk portion is 0.5-8 μm, preferably 0.5-5 μm.

The difference in grain size between the surface portion and the bulk portion is advantageous in that the smaller grain in the surface portion size gives a higher surface hardness, and a higher hardness at the surface of the body gives an improved resistance to for example abrasive wear. If the difference is too small, i.e. a similar grain size, no increase in surface hardness will be noticed. Another advantage with the present invention is that an increased hardness of the surface of the body gives an increased wear resistance simultaneously as the bulk portion can preserve its original toughness properties. A larger WC grain size in the bulk portion of the body usually gives benefit in providing toughness to the body.

The cemented carbide body of the present invention may be a cutting tool such as a cutting tool for milling, drilling or turning, for example a cutting tool insert, a drill or an end mill. The tool can for example be used in metal cutting of a metallic material such as carbon steel, stainless steel, cast iron, titanium alloys or other alloys or metallic materials.

The cemented carbide body of the present invention may be a drill bit for mining applications or a drawing die for wires or a forging tool.

The term "cemented carbide" is herein intended to denote a material comprising hard constituents in a metallic binder phase. The cemented carbide comprises WC grains, and can also comprise other carbides or carbonitrides of one or more of Ta, Ti, Nb, Cr, Hf, V, Mo and Zr, such as TiN, TiC and/or TiCN. WC grains are present both in the surface portion and in the bulk portion of the body. If other carbides and/or nitrides are present in the cemented carbide they can be located either in the surface portion, in the bulk or in both. The cemented carbide body should preferably consist of at least 60 wt %, more preferably more than 65 wt % WC, most preferably at least 70 wt % WC.

The metallic binder phase is a metal, and the metal can for example be selected from Cr, Mo, Fe, Co or Ni alone or in any combination. Preferably the metallic binder phase comprises only Co, a combination of Co and Ni, or a combination of Co, Ni and Fe. The metallic binder phase can comprise other suitable metals as known to the skilled person.

The surface of the body is in one embodiment the outermost surface of the body. The surface of the body can therefore correspond to the outermost surface of body. The surface of the body can in an alternative embodiment be coated with a surface coating, resulting in that the outermost surface of the coating corresponds to the outermost surface of the body and that the surface of the cemented carbide body faces the innermost surface of the coating.

The "bulk portion" of the body is here defined as the cemented carbide that typically is the main part of the body, i.e. the part of the body that is not the surface portion. The grain size of the WC in the bulk portion is typically the original grain size of WC of the body, i.e. the grain size of WC as achieved after the sintering process. The surface portion is not part of the bulk portion in the measurement of the WC grain sizes. In one embodiment the body consists of the surface portion and the bulk portion.

The term "surface portion" of the body is herein intended to denote the surface portion that is treated such that the grain size in this area is smaller than in the area surrounding said surface portion, i.e. than in the bulk portion. The surface portion is located at the surface of the body. The surface portion has an extension in the surface plane of the body and also an extension in a direction perpendicular to the surface, typically towards the core of the body. The extension of the surface portion in the direction perpendicular to the surface is herein defining the thickness of the surface portion. The body can be provided with one or several surface portions depending on the specific application and need.

The WC grains in the surface portion of the body are small as compared to the WC grains in the bulk of the body. The WC grains in the surface portion are herein defined to have a thickness, tg, and a length, lg. The thickness of the WC grain is the width of the grain at its smallest dimension. The length is the width at its largest dimension. The WC grain size of the bulk portion can be measured with a classical linear intercept method. The WC grains in the surface portion can for example be measured with the following method: Make a micrograph in 50.000× magnification of a surface of the surface portion. Draw a straight line in the micrograph that represents a distance at the surface of the sample of 7 µm. Measure the thickness, tg, and the length, lg, of each WC grain that is hit by the line. Repeat the procedure on a second micrograph of the same sample. Calculate an median thickness, tg, and an median length, lg, for this specific surface portion based on the measurements from the two micrographs.

The metallic binder phase content in the surface portion is 50-120 vol % of the metallic binder phase content in the bulk portion. This is advantageous in that the metallic binder phase contributes to toughness of the surface portion itself, and to increased adhesion to the bulk portion. If the binder phase content is too high, the hardness of the surface portion is decreased. The metallic binder phase content can for example be studied by Glow Discharge Optical Emission Sectroscopy (GDOES).

According to an embodiment of the invention the average thickness of said surface portion as measured in a direction perpendicular from the surface of the body is 0.5-20 µm, preferably 0.5-15 µm. The thickness of the surface portion may be 0.5-10 µm, 0.5-5 µm or 0.5-2 µm. The thickness can be measured by studying a through-cut of the body. The border between the surface portion and the bulk portion is usually very easy to find due to the clear difference in WC grain size. If the thickness of the surface portion is lower than preferred the improvements from increased wear resistance will be less pronounced.

In one embodiment the surface portion comprise plate-like and/or needle-like WC grains. One advantage with plate-like and/or needle-like WC grains is that these grains may influence the crack propagation so that any crack formed will deflect along the grain and thereby loose energy. In one embodiment the median thickness, tg, of the plate-like and/or needle-like WC grains is less than 200 nm, preferably less than 150 nm, more preferably less than 100 nm, even more preferably less than 50 nm. The median thickness, tg, of the plate-like and/or needle-like WC grains may be 20-200 nm, 20-100 nm or 20-50 nm. The thickness of the plate-like and/or needle-like WC grains can be measured in an image of a cross section of the surface portion, or from a top view. The plate-like and/or needle-like WC grains may be from submicron to micrometers in length, lg. In one embodiment the plate-like and/or needle-like WC grains has an median length, lg, of 100-500 nm, preferably 100-400 nm, more preferably 100-300 nm. In one embodiment of the present invention the ratio lg/tg of the plate-like and/or needle-like WC grains is >3, preferably >4. In one embodiment said lg/tg ratio is between 3 and 10, preferably between 4 and 8.

According to an embodiment of the invention the extension of the surface portion at the surface of the tool is at least 2 mm². The extension of the surface portion as the surface can be adapted by the skilled person to suit the specific application. The surface hardening according to the present invention is very flexible in that any area that only the areas that benefit from an increased hardness can be treated while other areas can be left untreated.

According to an embodiment the body comprises a wear resistant coating such as a CVD or a PVD coating. Wear resistant coatings are often ceramic coatings that can increase the abrasive wear resistance and the chemical wear resistance of the body. The coating is preferably a ceramic coating such as TiN, TiCN, $Al_2O_3$ or TiAlN or a combination of any of these. These coatings are often brittle and needs to be supported by a relatively hard body not to brake or spall off. The surface portion of the cemented carbide body of the present invention can improve this supporting of a coating and thereby prolong the lifetime of the body, even for cemented carbide bodies that otherwise would be too weak for the coating.

According to one embodiment of the invention the body is a cutting tool and the surface portion is located in the area of the body that is to be involved in cutting. Since the aim of the surface portion is to increase the wear resistance of the body, and it is the area involved in cutting that is normally worn, the surface portion is naturally places in this area. The portion can alternatively be placed only on the rake face, only on the flank face, only on the cutting edge or any combination of these. The whole outer surface of the insert can in one alternative be the surface portion.

The present invention also relates to a method of making a surface hardening of a cemented carbide body comprising the steps of:

providing a cemented carbide body of sintered cemented carbide comprising WC and metallic binder, wherein said cemented carbide body comprises a bulk surrounded by a surface, providing a first local heat treatment of a portion of the surface of the cemented carbide body at a temperature that is higher than or equal to the melting temperature of the WC, thereby forming a surface portion of the cemented carbide body, providing a second heat treatment of the cemented carbide body at a temperature on or below the melting temperature of the metallic binder phase, and lower than the melting temperature of the WC, in a neutral or carburizing atmosphere such that the WC recrystallize, and thereby forming a cemented carbide body provided with a surface portion wherein the median grain thickness, tg, of WC is 20-300 nm, a metallic binder phase content in the surface portion is 50-120 vol %, and a ratio of the average grain size of WC in in the bulk portion is 0.5-8 µm.

The body of cemented carbide provided as the first step of the method can be manufactured with traditional methods, including for example powder mixing, milling, spray drying, pressing, sintering and pre-treatment to set the geometry such as blasting or brushing. The cemented carbide body that is provided as a first step in the method is a sintered cemented carbide body with a geometry that is selected for its purpose. Prior to applying the first local heat treatment the body may be pre-treated with methods such as grinding, polishing or blasting. The pre-treatment or pre-treatments can be applied for example to influence the surface roughness, the geometry and/or the residual stress of the body.

The body of cemented carbide is subjected to a first local heat treatment. During this first local heat treatment the surface portion is initiated by melting the WC grains in a surface portion of the cemented carbide body. The WC grains can be melted by for example applying a laser beam to the surface. Simultaneously as the WC grains melt, the metallic binder phase evaporates whereby this portion is depleted from binder phase. The metallic binder phase content is decreased in a surface zone during the first local heat treatment, and this surface zone can be larger than the surface portion, i.e. the amount of metallic binder phase just beneath the surface portion can be decreased by the first heat treatment. The beam used during this first local heat treatment needs to be of sufficient intensity and power to melt the WC.

Subsequent to the first local heat treatment follows the second heat treatment of the cemented carbide body. During the second heat treatment the formation of the surface portion is completed. The previously melted WC grains are in this step re-crystallized and metallic binder phase is transferred from the bulk portion and into the surface portion. The temperature during the second heat treatment needs to be sufficient for the WC grains to crystallize and the rate of crystallization it preferably at a level that makes the recrystallization controllable. The temperature during the second heat treatment should be on or below the melting temperature of the metallic binder phase. A too high temperature might lead to a dissolution and re-precipitation process (Ostwal ripening) and coalescence of WC in a liquid metallic binder phase and grain coarsening of the WC. If the temperature is too low the re-nucleation and/or metallic binder phase movement will not occur. The temperature during the second heat treatment is preferably between 800° C. and 1250° C., more preferably between 900° C. and 1200° C., most preferably between 1050° C. and 1150° C.

The surface portion is, before the second heat treatment, decarburized. During the second heat treatment the metallic binder phase diffuses into the surface portion from the bulk portion. To re-crystallize the WC grains carbon needs to be present. The carbon can follow the metallic binder phase to the surface portion and/or reach the surface portion from the surrounding atmosphere. The atmosphere cannot be decarburizing, such as atmosphere with high partial pressure of $H_2$, since removal of carbon from the surface will counteract the recrystallization of WC in the surface portion. A neutral atmosphere is herein defied by an atmosphere that does not react with the surface portion, for example Ar atmosphere or vacuum.

The atmosphere during this second heat treatment is adapted to make a movement of the metallic binder phase possible. The movement of a metallic binder phase at increased temperature is influenced by pressure and carbon presentation. The small grains in the surface portion attract the metallic binder phase and probably contribute to the binder phase movement.

The initial content of metallic binder phase in the bulk influences the formation of the surface portion in that a higher content of metallic binder phase gives that a lower temperature can be used during the second heat treatment to recrystallize WC. Generally, a smaller grain size of the bulk of the cemented carbide body and a lower metallic binder phase content of the bulk increases the thickness of the surface portion formed while larger WC grains and higher metallic binder phase content increases the speed of the second heat treatment.

The selection of time for the first local heat treatment and the second heat treatment can be adjusted by the skilled person.

In one embodiment of the present invention said local surface heat treatment is made with laser. In another embodiment of the present invention said first local surface treatment is made with Electrical Discharge Machining (EDM). The local heat treatment can alternatively be made with any other suitable technique known to the skilled person which technique results in the local melting of the WC at the surface of the body. Other known methods can be used to provide the first local surface treatment, such as Electro erosive melting of surface or Electron beam melting.

In one embodiment of the present invention a general heating is applied during the first local heat treatment to reduce the risk of cracks.

In one embodiment of the present invention the second heat treatment comprises a step of heating the body at 1050-1150° C. In one embodiment of the present invention the temperature 1050-1150° C. is applied during 50-70 minutes during the second heat treatment. If the temperature is to low the penetration of metallic binder phase into the surface portion will be insufficient resulting in a low bonding force of the surface portion to the bulk portion. If the temperature is too high the WC grains will grow larger and the effect of the reduced WC grain size will be reduced. Further, the cemented carbide body is typically ground and the geometry well defined before the formation of the surface portion, and if the heat treatment is made at a too high temperature it might result in a shape distortion of the body.

In one embodiment of the present invention the second heat treatment is made in vacuum or in an atmosphere comprising CO, CH4 and/or Ar. In one embodiment the second heat treatment is made in vacuum, such as $10^{-2}$ mBar vacuum. In one embodiment the second heat treatment is made in a neutral Ar atmosphere at a pressure of about 80-100 mBar.

Still other objects and features of the present invention will become apparent from the following detailed description considered in conjunction with the accompanying drawings.

DETAILED DESCRIPTION OF THE INVENTION

Figure 1:
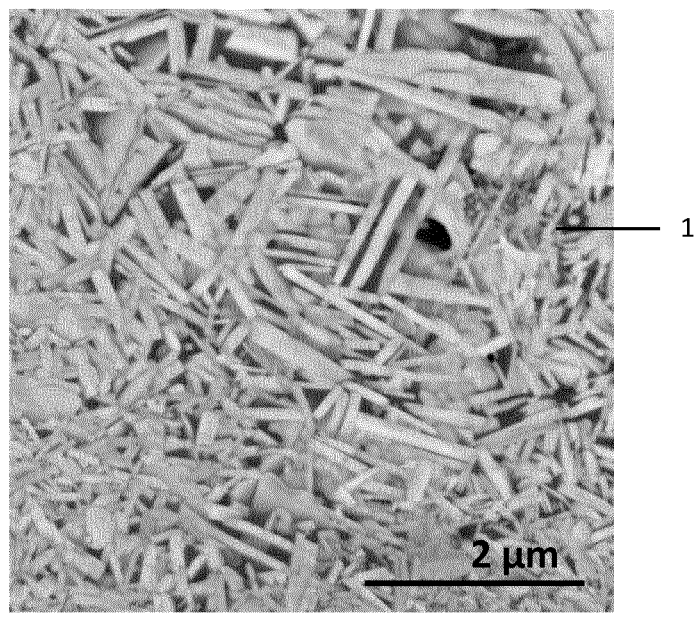
FIG. 1. A Scanning Electron Microscope (SEM) image of a top view of a surface portion of the sample D+P3+ T(soak)1100. The WC grains are light in colour.
Figure 2:
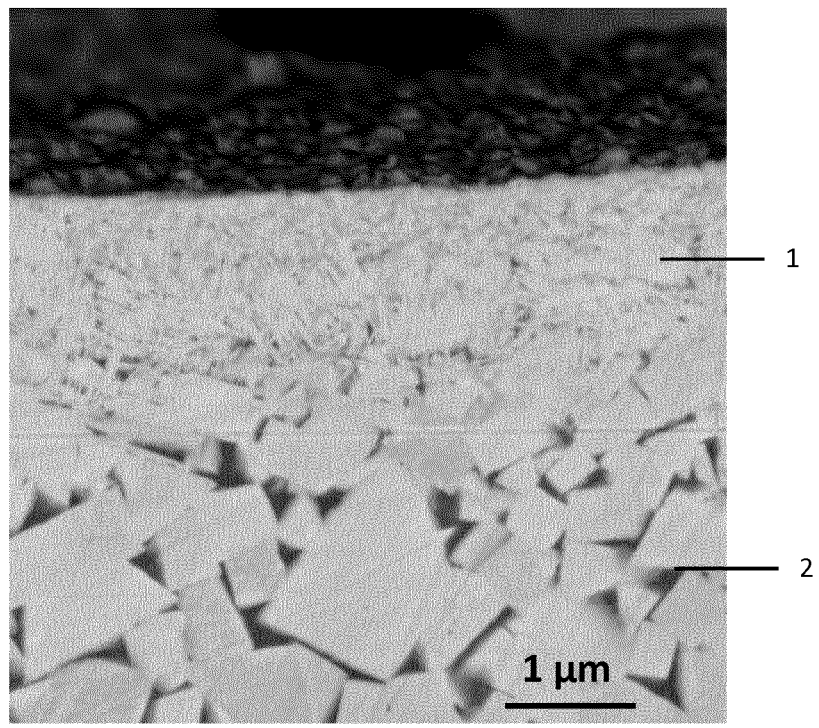
FIG. 2. A Scanning Electron Microscope (SEM) image of a trough cut (cross section) of a surface portion of the sample D+P3+ T(soak)1100. The larger WC grains of the bulk portion (2) is visible below the smaller WC grains of the surface portion (1).
Figure 3:
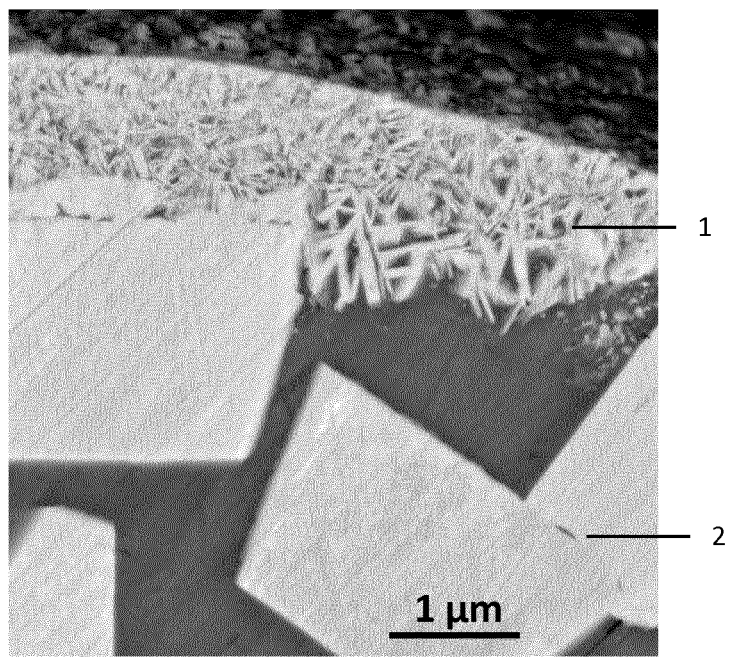
FIG. 3. A Scanning Electron Microscope (SEM) image of a trough cut (cross section) of a surface portion of the sample E+P3+ T(soak)1100. The larger WC grains of the bulk portion (2) is visible below the smaller WC grains of the surface portion (1).
Figure 4:
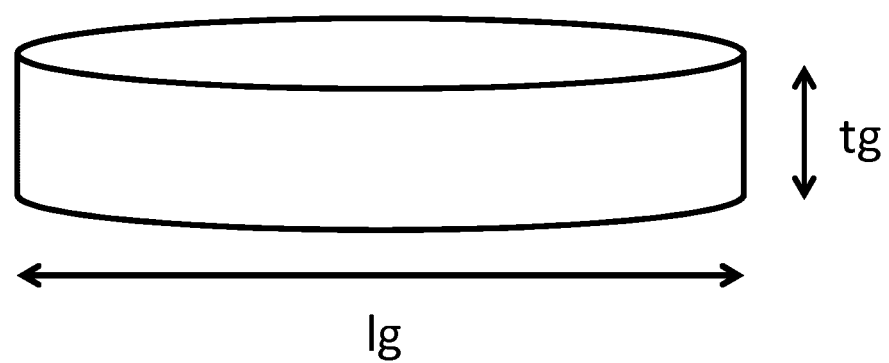
FIG. 4. A schematic drawing of a grain showing a WC grain with a grain length, lg, and a grain thickness, tg.
Figure 5:
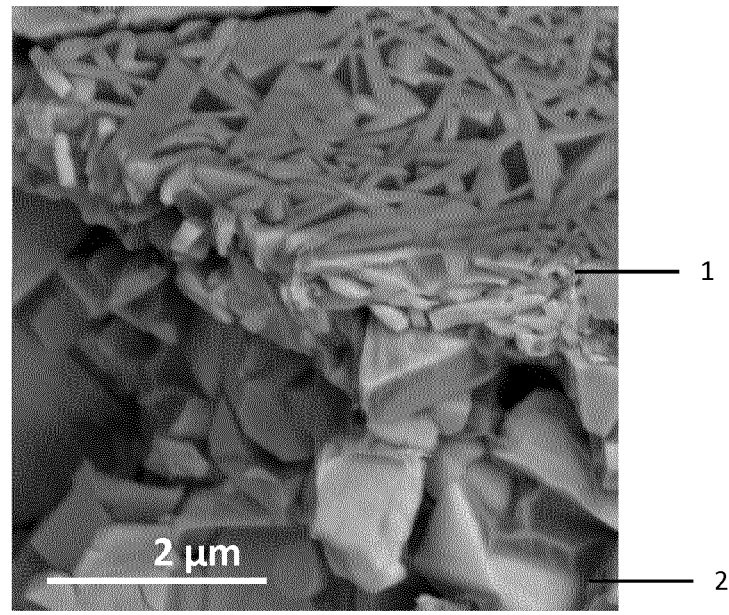
FIG. 5. A Scanning Electron Microscope (SEM) image of a fractured cross section of a surface portion of the sample D+P3+ T(soak)1100.
Figure 6:
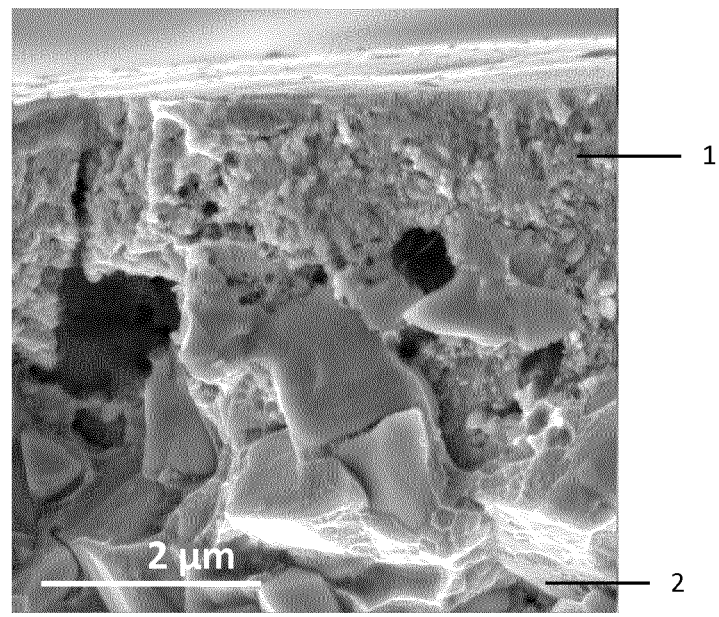
FIG. 6. A Scanning Electron Microscope (SEM) image of a fractured cross section of an initiated surface portion before the second heat treatment has been applied, i.e. directly after the first local heat treatment, of the sample D+P3.

Embodiments of the present invention will be disclosed in more detail in connection with the following examples. The examples are to be considered as illustrative and not limiting embodiments.

EXAMPLES

Example 1

Cemented carbide inserts of SNUN 120408 geometry with the compositions shown in Table 1 were manufactured. The cemented carbide inserts were produced using standard powder processes including powder milling and mixing, spray drying, pressing and sintering. The composition shown in Table 1 is based on the weight of the powders as added in the initial milling and mixing step. The grain size of the WC was measured with linear intercept method on a through cut of the sintered insert. The hardness is measured as HV30 in a Vickers indenter on the rake face of the sintered insert.

TABLE 1

Cemented carbides bodies
Body

| ID | Composition Co [wt %] | Ti [wt %] | TaNb [wt %] | Cr [wt %] | WC [wt %] | Average grain size of WC [µm] | Hardness [HV30] | Coercivity HCj [kAm−1] |
|---|---|---|---|---|---|---|---|---|
| A | 6 | — | 0.16 | — | 93.84 | 0.9 | 1600 | 16.5 |
| B | 7 | — | — | 0.3 | 92.7 | 0.65 | 1700 | 23 |
| C | 10 | — | 0.5 | 0.4 | 89.1 | 0.6 | 1610 | 20.5 |
| D | 10.2 | — | 1.5 | — | 88.3 | 1.1 | 1320 | 12.3 |
| E | 25.5 | — | — | — | 74.5 | 4 | 900 | 5 |

The cemented carbide bodies A, B, C, D and E were laser treated to initiate the formation of the local hardened surface area, here also called the surface portion. A first local heat treatment, here a laser heat treatment, was performed with a Medicom LD50s Nd:YAG laser with a wave length of 1064 nm and a maximum power of 50 W. An area of about 2 mm$^2$ was treated at each cemented carbide body. The used settings of the laser at the different treatments T1, T2, T3, T4, T5 and P3 are shown in Table 2.

TABLE 2

Laser settings

| | T1 | T2 | T3 | T4 | T5 | P3 |
|---|---|---|---|---|---|---|
| Pulse length (ns) | 120 | 120 | 120 | 120 | 120 | 120 |
| Spot diameter (mm) | 0.1 | 0.1 | 0.1 | 0.1 | 0.1 | 0.1 |
| Power (W) | 23.4 | 19.5 | 15.55 | 11.63 | 7.7 | 38.5 |
| Frequency (Hz) | 3000 | 3000 | 3000 | 3000 | 3000 | 15000 |
| Speed (mm/s) | 270 | 270 | 270 | 270 | 270 | 600 |
| Pulse energy (mJ) | 7.1 | 6.5 | 5.18 | 3.88 | 2.6 | 2.6 |
| Overlap (%) | 10 | 10 | 10 | 10 | 10 | 60 |
| Passes (No) | 1 | 1 | 1 | 1 | 1 | 4 |
| Environment | Air (Room temp) | Air (Room temp) | Air (Room temp) | Air (Room temp) | Air (Room temp) | Air (Room temp) |

The settings of the laser are selected to be high enough to give a melting of the WC grains, while low enough not introduce increased surface roughness or cracks to the surface. If the overlap is too high, the crack density will be unacceptable high.

The laser treated samples were subsequently heat treated in a second heat treatment. The purpose of the second heat treatment is to let the WC grains re-nucleate and grow to a suitable grain size, and to let the metallic binder phase diffuse into the laser treated portion to increase its toughness. The shape of the re-nucleated WC grains may be plate-like and/or needle-like.

The second heat treatment was performed by placing the laser treated samples D+P3 in a PVA-Tepla COV 231R Machine. In a first step the temperature was increased to 350° C. in H$_2$ atmosphere. In a subsequent second step the temperature was increased by 10° C. per minute up to the temperature T(soak) in Ar atmosphere and 90 mBar. In a subsequent third step the temperature was held at the temperature T(soak) in Ar protective atmosphere in 90 mbar for 1 hour. In a fourth and final step the temperature was lowered and the samples were cooled down to room temperature. A second heat treatment was also done in 1 atm H$_2$ at 800° C. and 900° C., but in this case no WC grains were visible.

Table 3 shows an evaluation of temperature T(soak) for second heat treatment. The temperature T(soak) was applies for 1 hour. It was found that 1100° C. was a suitable temperature to use based on the size of the WC grains recrystallized and on the hardness. The micro hardness of the surface layer was measured on samples with a micro hardness indenter Fischerscope with the load 15 mN/20 seconds with the method 15014577. Calibration was made with a WC/Co standard sample with HUpI (300 mN/60 s) of 25521 N/mm$^2$.

TABLE 3

Hardness of surface portion after second heat treatment

| Sample | Temperature T(soak) (° C.) | Grain size of WC in surface portion | Micro hardness surface portion, HUpl (N/mm2) |
|---|---|---|---|
| D + P3 + T(soak)600 | 600 | No WC grains visible | 25590 |
| D + P3 + T(soak)700 | 700 | No WC grains visible | 24710 |
| D + P3 + T(soak)800 | 800 | Ultrafine WC grains, difficult to measure | 28320 |
| D + P3 + T(soak)900 | 900 | Very fine WC grains, difficult to measure | 26690 |
| D + P3 + T(soak)1000 | 1000 | Very fine WC grains, difficult to measure | 29070 |
| D + P3 + T(soak)1100 | 1100 | Fine WC grains | 35050 |
| D + P3 + T(soak)1200 | 1200 | Fine WC grains | 29090 |
| D + P3 + T(soak)800 (H$_2$) | 800 | No WC grains visible | — |
| D + P3 + T(soak)900 (H$_2$) | 900 | No WC grains visible | — |

The thickness of the surface portion was measured at cross section image, after a second heat treatment of T(soak) 1100° C. The results are shown in Table 4.

TABLE 4

Thickness of surface portion

Laser parameter/Average thickness of surface portion [µm]

| SAMPLE | T1 | T2 | T3 | T4 | T5 | P3 |
|---|---|---|---|---|---|---|
| A + T (soak) 1100 | 0.89 | 0.94 | 1.11 | 1.07 | 0.8 | — |
| B + T (soak) 1100 | 1.51 | 1.35 | 0.78 | 0.89 | 1.06 | — |
| C + T (soak) 1100 | 1.12 | 1.02 | 1.15 | 1.4 | 1.055 | — |
| D + T (soak) 1100 | 1.07 | 0.77 | 0.9 | 0.87 | 0.81 | 1.35 |
| E + T (soak) 1100 | 0.91 | 1.08 | 1.12 | 0.88 | 0.89 | — |

The surface portion for the samples A-E heat treated with T5 and sample D+P3 was analyzed with regards to WC grain size. The WC grain length, lg, and thickness, tg, of the surface portion were measured with the following method: Four SEM micrographs of 50.000× magnification of a surface of the surface portion was provided for the same sample. A straight line was drawn in the micrograph that represented a distance at the surface of the sample of 7 µm. The thickness, tg, and the length, lg, of each WC grain that was hit by the line was measured. The procedure was repeated on the second micrograph of the same sample. An median thickness, tg, and an median length, lg, for this specific surface portion were calculated. The ratio of lg/tg was calculated for each sample. The results are shown in Table 5.

TABLE 5

WC grain size of surface portion and bulk portion

| Sample | Median WC grain thickness, tg, surface portion [nm] | Median WC grain length, lg, surface portion [nm] | Ratio lg/tg | Average WC grain size bulk portion [nm] |
|---|---|---|---|---|
| A + T5 + T(soak) 1100 | 35 | 165 | 4.7 | 900 |
| B + T5 + T(soak) 1100 | 33 | 173 | 5.2 | 650 |
| C + T5 + T(soak) 1100 | 36 | 183 | 5.1 | 600 |
| D + T5 + T(soak) 1100 | 32 | 162 | 5.1 | 1100 |
| D + P3 + T(soak) 1100 | 43 | 256 | 6.0 | 1100 |
| E + T5 + T(soak) 1100 | 33 | 214 | 6.5 | 4000 |

Example 2

Sample D+P3+T(soak)1100 of Example 1, but with a milling geometry SPKN 1203EDER, were PVD coated with a coating comprising an inner layer of 0.3 µm thick TiN, an intermediate layer of 4 µm thick nano layered TiAlN and an outermost layer of 0.5 µm TiN, all deposited with arc evaporation.

The PVD coated samples were evaluated in two separate dry milling cutting test in a work piece material of C60. The cutting parameters are shown in Table 6. A subsequent study of the cutting edges after the tests showed that no coating flaking occurred during the cutting.

TABLE 6

Cutting parameters

| Cutting parameter | Milling test 1 | Milling test 2 |
|---|---|---|
| Cutting speed, Vc (m/min) | 280 | 320 |
| Feed, Fz (mm/tooth) | 0.25 | 0.15 |
| Depth of cut, ap (mm) | 2.5 | 2.5 |
| Cutting fluid | No | No |

Example 3

Sample D+P3+T(soak)1100 of Example 1, but with turning geometry CNMG 120408, were CVD coated with CVD coating comprising an inner layer of 0.3 µm TiN, a layer of 3.5 µm MT-TiCN, a bonding layer of 0.2 µm TiCNO and an outermost layer of 3.5 µm $Al_2O_3$. The CVD coated samples were successfully blasted in a wet blasting process with alumina. The CVD coated samples were evaluated in a turning cutting test against a work piece material of AISI 316L. No cutting fluid was used. The cutting parameters were: Cutting speed: 200 m/min, Feed: 0.25 mm/tooth and Depth of cut: 1.5 mm. No coating flaking was observed. The life time of the coated insert comprising a surface portion in accordance with the present invention was comparable to the lifetime of the references, i.e. the coated inserts that was not provided with a surface portion.

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A method of making a surface hardening of a cemented carbide body comprising the steps of:
    providing a cemented carbide body of sintered cemented carbide having WC and a metallic binder phase, wherein said cemented carbide body is a bulk portion surrounded by a surface;
    providing a first local heat treatment of a portion of the surface of the cemented carbide body at a temperature that is higher than or equal to a melting temperature of the WC, thereby forming a surface portion of the cemented carbide body; and
    providing a second heat treatment of the cemented carbide body at a temperature at or below a melting temperature of the metallic binder phase, in a neutral of carburizing atmosphere, such that the WC recrystallizes, thereby forming the cemented carbide body provided with the surface portion, wherein an average grain thickness, tg, which is a smallest dimension through the grain of WC is 20-300 nm, a metallic binder phase content in the surface portion is 50-120 vol % of a metallic binder phase content in the bulk portion, and the average grain size of WC in the bulk portion is 0.5-8 µm.

2. The method in accordance with claim 1, wherein said first local heat treatment is made with laser.

3. The method in accordance with claim 1, wherein said first local heat treatment is made with Electrical Discharge Machining (EDM).

4. The method in accordance with claim 1, wherein the second heat treatment includes a step of heating the body at 1050-1150° C.

5. The method according to claim 4, wherein the temperature 1050-1150° C. is applied for 50-70 minutes.

6. The method in accordance with claim 1, wherein the second heat treatment occurs in a vacuum or in an atmosphere including $CO$, $CH_4$ and/or $Ar$.

* * * * *